(12) United States Patent
Kim et al.

(10) Patent No.: US 8,060,024 B2
(45) Date of Patent: Nov. 15, 2011

(54) APPARATUS AND METHOD FOR TRANSMITTING DATA IN A COMMUNICATION SYSTEM

(75) Inventors: Nam-Gi Kim, Suwon-si (KR); Soon-Young Yoon, Seoul (KR); Jae-Hee Cho, Seoul (KR); Jang-Hoon Yang, Seongnam-si (KR); June Moon, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 770 days.

(21) Appl. No.: 11/831,077

(22) Filed: Jul. 31, 2007

(65) Prior Publication Data
US 2008/0032645 A1    Feb. 7, 2008

(30) Foreign Application Priority Data
Aug. 1, 2006    (KR) .................. 10-2006-0072524

(51) Int. Cl.
*H04B 1/00* (2006.01)
*H04K 3/00* (2006.01)

(52) U.S. Cl. ..................... 455/69; 455/127.1

(58) Field of Classification Search ............. 455/69, 455/127.1, 522; 370/208, 344
See application file for complete search history.

(56) References Cited

U.S. PATENT DOCUMENTS

| 7,042,858 | B1 | 5/2006 | Ma et al. |
| 7,383,057 | B1 * | 6/2008 | Senarath et al. ............. 455/522 |
| 2005/0201325 | A1 * | 9/2005 | Kang et al. .................... 370/328 |
| 2006/0229096 | A1 * | 10/2006 | Dominique et al. ......... 455/522 |
| 2008/0075027 | A1 * | 3/2008 | Lee et al. ..................... 370/311 |

FOREIGN PATENT DOCUMENTS

| KR | 10-2002-0041470 A | 6/2002 |
| KR | 2002-41470 | 6/2002 |
| KR | 10-2006-0073617 A | 6/2006 |

* cited by examiner

*Primary Examiner* — Lee Nguyen
(74) *Attorney, Agent, or Firm* — Jefferson IP Law, LLP

(57) ABSTRACT

An apparatus and method for transmitting data in a communication system are provided. The method for transmitting the data includes determining data to be transmitted over a power boosting zone, generating a power boosting zone used for power-boosting and transmitting the data, allocating the data to the generated power boosting zone and power-boosting and transmitting the power boosting zone.

13 Claims, 4 Drawing Sheets

APPARATUS AND METHOD FOR TRANSMITTING DATA IN A COMMUNICATION SYSTEM

PRIORITY

This application claims the benefit under 35 U.S.C. §119(a) of a Korean patent application filed in the Korean Intellectual Property Office on Aug. 1, 2006 and assigned Serial No. 2006-72524, the entire disclosure of which is hereby incorporated by reference.

BACKGROUND OF THE INVENTION

1. Field of the Invention

The present invention relates generally to a communication system. More particularly, the present invention relates to an apparatus and method for transmitting data in a communication system.

2. Description of the Related Art

Intensive research on the $4^{th}$ Generation (4G) communication system, or a next generation communication system, is being conducted to provide high-speed services with various Quality of Service (QoS) classes to users. More particularly, active research on the 4G communication system is being performed to support high-speed services in the way of guaranteeing mobility and QoS for a Broadband Wireless Access (BWA) communication system such as a wireless Local Area Network (LAN) system and a wireless Metropolitan Area Network (MAN) system.

A wireless channel environment in a communication system, compared to a wired channel environment, may suffer from a loss of transmission/reception data due to occurrence of an error caused by several factors such as multiple path interference, shadowing, propagation loss, time-varying noise, interference, fading and the like. The data loss acts as a factor of reducing the entire performance of the communication system. In particular, when a receiver, or mobile station (MS), of the communication system is located in an area where cells managed by a transmitter or base station (BS), from which the receiver receives a service, overlap each other, or when the receiver is located in a cell boundary, the system performance is reduced.

A description will now be made of a structure of a frame used for data transmission/reception between a transmitter and a receiver of the communication system. The communication system transmits the frame for data transmission, and the frame includes data therein, for example, a Frame Control Header (FCH), a MAP and data bursts.

The FCH and MAP transmitted over the frame are broadcast data that mobile stations will receive in common. The FCH, composed of a predetermined number of sub-channels, transfers basic information on sub-channels, ranging, and modulation schemes. A size of the MAP can be determined by parsing the FCH information.

The MAP includes data burst extraction information such as locations and sizes of data bursts in the frame, and a variety of information for providing a service to mobile stations. Therefore, by parsing the MAP information, the mobile station can extract its received data bursts in the frame.

The frame includes multiple data bursts, or normal data, and the mobile station extracts data from the data bursts based on the information acquired by parsing the MAP.

For this purpose, there is a scheme for preventing a loss of important data transmitted over the frame. To this end, a base station of the communication system transmits important data, for example the MAP of the frame, using a low modulation order, a low coding rate and repetition.

For example, when transmitting the MAP, the base station uses Quadrature Phase Shift Keying (QPSK) ½ and sets the number of repetitions to 6.

The use of the low coding rate and the repetition for the MAP data transmission can prevent the loss of the MAP. However, use of this data transmission method may cause a waste of wireless resources for actual data transmission. The waste of the wireless resources reduces the entire system performance.

Therefore, there is a need for a scheme for transmitting data so as to prevent a loss of important data in the wireless channel environment without a waste of resources to thereby prevent a reduction in the system performance in a communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting data in a communication system.

Another aspect of the present invention is to provide a data transmission apparatus and method for preventing a reduction in system performance in a communication system.

Another aspect of the present invention is to provide a data transmission apparatus and method for preventing a waste of resources due to data transmission in a communication system.

Another aspect of the present invention is to provide a data transmission apparatus and method for preventing a data loss in a communication system.

According to one aspect of the present invention, a method for transmitting data in a communication system is provided. The method includes determining data to be transmitted over a power boosting zone, generating a power boosting zone used for power-boosting and transmitting the data, allocating the data to the generated power boosting zone and power-boosting and transmitting the power boosting zone.

According to another aspect of the present invention, an apparatus for transmitting data in a communication system is provided. The apparatus includes a scheduler for performing scheduling so as to determine data to be transmitted over a power boosting zone, generate a power boosting zone used for power-boosting and transmitting the data, and allocate the data to the generated power boosting zone, and for generating scheduling information according to the scheduling; and a power controller for performing power control so as to power-boost and transmit the power boosting zone according to the scheduling information received from the scheduler.

BRIEF DESCRIPTION OF THE DRAWINGS

The above and other aspects, features and advantages of certain exemplary embodiment of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations will be omitted for clarity and conciseness.

The present invention includes an apparatus and method for transmitting data by performing power boosting, or by managing a power boosting zone, in a communication system. To this end, an exemplary embodiment of the present invention generates a power boosting zone in each frame on a frame-by-frame basis, allocates data to the power boosting zone, and power-boosts the power boosting zone during data transmission. The important data allocated to the power boosting zone can include a frame header, a MAP and a data burst. In particular, MAP information for data burst restoration can be allocated to the power boosting zone.

Figure 1:
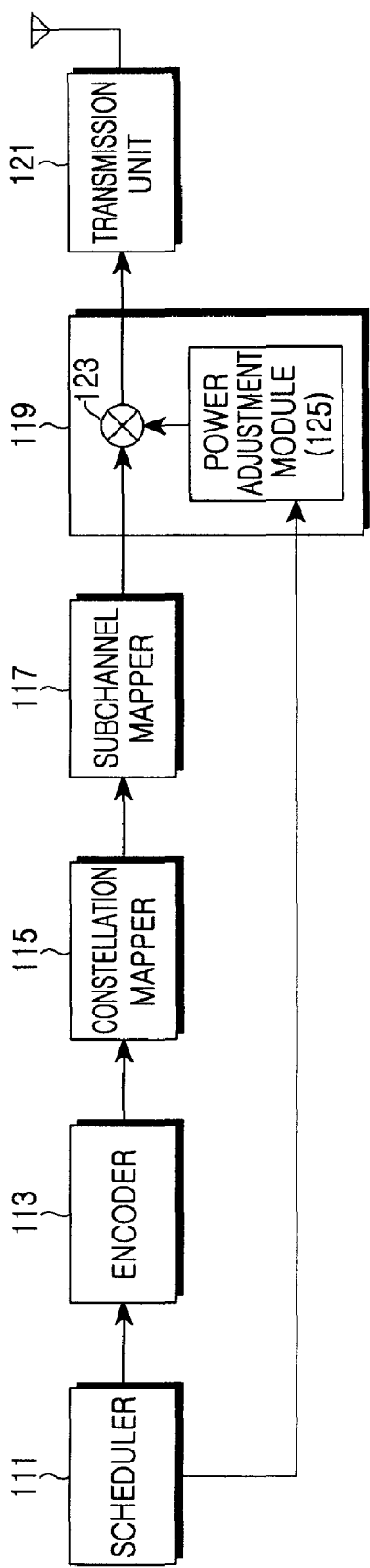
FIG. 1 is a schematic diagram illustrating a structure of a transmitter for transmitting data through power control according to an exemplary embodiment of the present invention.

FIG. 1 is a schematic diagram illustrating a structure of a transmitter for transmitting data through power control according to an exemplary embodiment of the present invention.

Referring to FIG. 1, the transmitter, or a base station (BS), includes a scheduler 111, an encoder 113, a constellation mapper 115, a sub-channel mapper 117, a power controller 119 and a transmission unit 121.

Figure 2A:
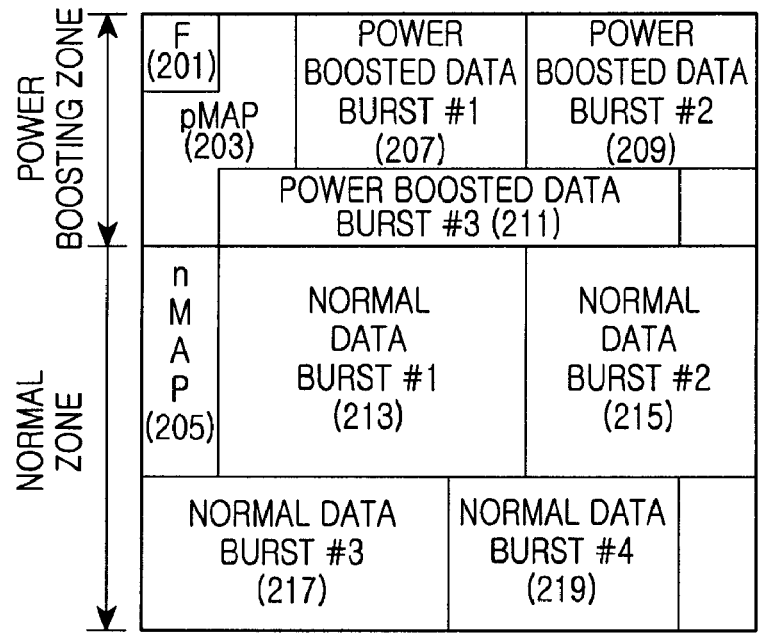
FIGS. 2A and 2B are schematic diagram illustrating a structure of a frame for transmitting data over a power boosting zone according to an exemplary embodiment of the present invention.
Figure 2B:
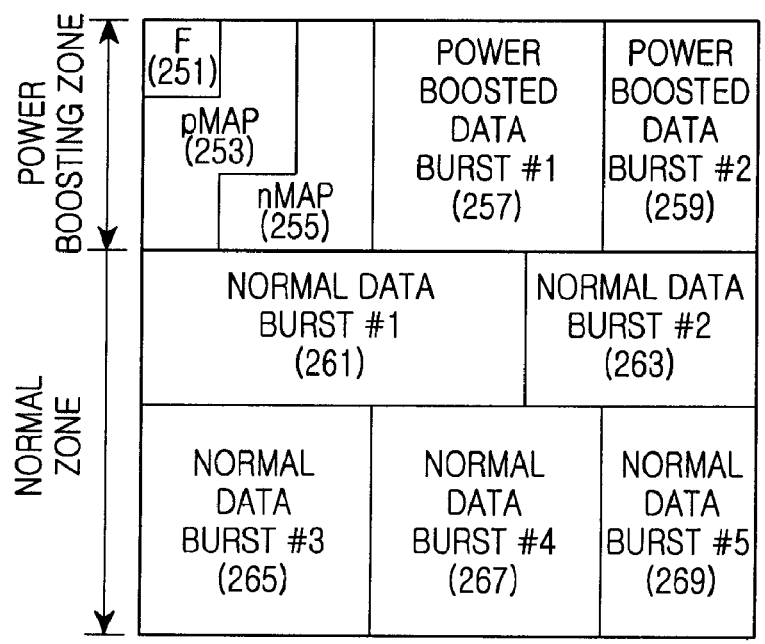

The scheduler 111 performs scheduling so as to transmit data over a power boosting zone. For example, the scheduler 111 schedules data so as to generate a power boosting zone on a frame-by-frame basis. Reference will be made below to FIGS. 2A and 2B to provide a detailed description of a frame structure including a power boosting zone proposed by the present invention.

The scheduler 111 determines data to be transmitted over a power boosting zone of the current frame. For this purpose, the scheduler 111 selects a receiver, or a mobile station (MS), which corresponds to the data to be transmitted over the current frame.

For example, the scheduler 111 can select the mobile station taking into account an amount of required service, priority, and channel status of mobile stations. The term 'amount of required service' as used herein refers to the amount of required data (service) that the mobile stations desire to receive. In addition, the term 'priority' refers to a priority of the mobile station, or to a data transmission priority of the mobile station. The channel status can be measured using Carrier-to-Interference and Noise Ratio (CINR) and/or Signal-to-Noise Ratio (SNR).

The mobile stations selected by the scheduler 111 are mobile stations that will receive data at the current frame. The scheduler 111 reselects mobile stations that will receive data over the power boosting zone, from among the selected mobile stations.

The scheduler 111 herein selects the mobile stations that will receive data at the current frame, or the mobile stations that will receive data over a power boosting zone of the current frame, taking into account the amount of required service, priority, and channel status of the mobile stations. The scheduler 111 selects the mobile stations that will receive data over the power boosting zone, and determines data of the selected mobile stations as data to be transmitted over the power boosting zone.

In this manner, the scheduler 111, when selecting the mobile stations, can take into consideration such factors as amount of required service, priority, and channel status of the mobile stations. For example, the scheduler 111 can set a threshold for each of the factors, and select the mobile station that will receive data over the power boosting zone, using the set thresholds.

After selecting the mobile station to which it will transmit data over the power boosting zone, the scheduler 111 can determine data bursts for the mobile station. For this purpose, the scheduler 111 can perform scheduling so as to generate a MAP for restoration of data bursts transmitted at the current frame.

The scheduler 111 performs scheduling so as to generate a power boosting MAP (pMAP) to be transmitted over the power boosting zone, and to generate a normal MAP (nMAP) to be transmitted over a normal power transmission zone (hereinafter referred to as 'normal zone') where power boosting is not performed. The power boosting zone is a zone where higher power is allocated, i.e. power boosting is performed, during data transmission, compared to the normal zone. Therefore, when data is transmitted over the power boosting zone, a reception probability at the mobile station can increase even though particular data is not repeatedly transmitted as done in the prior art. The scheduler 111 performs scheduling so as to form the nMAP and the pMAP using allocation information of the data bursts, and channel information of the mobile stations.

Therefore, the scheduler 111 performs scheduling so that data to be transmitted over the power boosting zone after undergoing power boosting can be allocated. In addition, the scheduler 111 can perform scheduling so that a frame header for restoration of the MAP, i.e. pMAP and nMAP information, may be included in the power boosting zone during transmission. The frame header of an exemplary embodiment of the present invention includes information on the power boosting zone, and information indicating location and/or size of the power boosting zone. Therefore, the scheduler 111 performs scheduling so as to transmit data over the power boosting zone, and the data transmitted over the power boosting zone includes at least one of FCH, MAP and data burst.

The scheduler 111 can perform scheduling so as to transmit the pMAP to be power-boosted, over the power boosting zone, and can restore data bursts based on the pMAP. The scheduler 111 herein can perform scheduling so as to allocate the data bursts to be restored based on the pMAP, to the power boosting zone or the normal zone.

The scheduler 111, according to its selection, can perform scheduling so as to include in the power boosting zone the nMAP that is transmitted over the normal zone where power boosting is not performed during frame transmission. The restoration of the data bursts is possible based on even the nMAP, and the scheduler 111 performs scheduling so as to allocate the data bursts to be restored based on the nMAP, to the normal zone.

The scheduler 111 generates scheduling information based on the scheduling operation, and transmits the scheduling information to the encoder 113 and the power controller 119.

The encoder 113 encodes the data scheduled by the scheduler 111, and outputs the result to the constellation mapper 115. The encoder 113 performs encoding using an encoding scheme previously set therein.

The constellation mapper 115 maps the bits output from the encoder 113 to a value in one of preset constellation levels, i.e. to one symbol, and then outputs the mapping result to the sub-channel mapper 117.

The sub-channel mapper 117 maps the signals output from the constellation mapper 115 to a sub-channel, and outputs the mapping result to the power controller 119.

The power controller 119 performs power control so as to power-boost the power boosting zone depending on the scheduling information received from the scheduler 111. The power controller 119 includes a mixer 123 and a power adjustment module 125.

The power adjustment module 125 controls transmission power on a frame-by-frame basis using data scheduling information from the scheduler 111, and provides the transmission power to the mixer 123. The mixer 123 mixes the data input from the sub-channel mapper 117 with the power provided from the power adjustment module 125, and outputs the result to the transmission unit 121. Therefore, the power boosting zone is higher than the normal zone where power boosting is not performed, in terms of the transmission power allocated thereto by the power controller 119.

The transmission unit 121 performs radio processing on the signal output from the power controller 119 to up-convert the signal into a radio signal, and then transmits the radio signal via an antenna.

The structure of the transmitter, or base station, for managing the power boosting zone according to an exemplary embodiment of the present invention has been described so far with reference to FIG. 1. Next, with reference to FIGS. 2A and 2B, a description will be made of a structure of a frame generated by a scheduler.

FIGS. 2A and 2B are schematic diagram illustrating a structure of a frame for transmitting data over a power boosting zone according to an exemplary embodiment of the present invention.

Referring to FIG. 2A, the frame according to an exemplary embodiment of the present invention includes therein a Frame Header 201, a pMAP 203, an nMAP 205, power boosted data bursts 207, 209 and 211, and normal data bursts 213, 215, 217 and 219.

The Frame Header 201 includes, for example, a Frame Control Header (FCH), and/or a Frame Prefix.

The Frame Header 201, which includes broadcast data that mobile stations will receive in common, is composed of a number of sub-channels and transmits basic information on sub-channels, ranging, and modulation scheme. For example, by parsing the frame header information, it is possible to determine a size of the MAP, i.e. pMAP and nMAP. As described above, the Frame Header 201 includes size and/or location information of the power boosting zone, as exemplary information on the power boosting zone.

The pMAP 203, like the Frame Header 201, is broadcast data that mobile stations will receive in common. The pMAP 203 includes data burst extraction information such as locations and sizes of data bursts in the frame, and a variety of information for providing a service to the mobile stations. Therefore, upon receipt of the frame, the mobile stations can extract data bursts in the frame by parsing the MAP information. In particular, the pMAP 203 includes information for data extraction of the data bursts 207, 209 and 211 transmitted over the power boosting zone.

The power boosted data bursts 207, 209 and 211 are data bursts to be transmitted to the mobile stations, and upon receipt of the frame, the receivers can extract the power boosted data bursts 207, 209 and 211 based on the information acquired by parsing the pMAP 203.

The nMAP 205, like the pMAP 203, is broadcast data that mobile stations will receive in common, and has similar information to that of the pMAP 203. However, the difference from the pMAP 203 lies in that the nMAP 205 includes information for extracting the normal data bursts 213, 215, 217 and 219 transmitted over the normal zone.

The receivers, receiving the frame, extract the normal data bursts 213, 215, 217 and 219 based on the information acquired by parsing the nMAP 205.

The frame of FIG. 2A includes Frame Header 201, pMAP 203, and power boosted data bursts 207, 209 and 211 in the power boosting zone, and performs power boosting on the information included in the power boosting zone during transmission. The normal zone except for the power boosting zone includes therein the nMAP 205 and the normal data bursts 213, 215, 217 and 219.

Referring to FIG. 2B, there is shown another exemplary structure of a frame according to an exemplary embodiment of the present invention. The frame includes therein a Frame Header 251, a pMAP 253, a nMAP 255, power boosted data bursts 257 and 259, and normal data bursts 261, 263, 265, 267 and 269.

The data included in the frame of FIG. 2B has been described in FIG. 2A, so reference will again be made to FIG. 2A. The frame of FIG. 2B, unlike the frame of FIG. 2A, includes the nMAP 255 in the power boosting zone during transmission.

The nMAP 255, similar to that described above, is broadcast information that all mobile stations receive in common, and can be transmitted over the power boosting zone because it includes basic system information and allocation information for the data bursts, received at the mobile stations. Therefore, as shown in FIG. 2B, the nMAP 255 is included in the power boosting zone.

The pMAP described in FIGS. 2A and 2B includes information for extracting the power boosted data bursts transmitted over the power boosting zone, and the nMAP includes information for extracting the normal data bursts transmitted over the normal zone.

In this manner, an exemplary embodiment of the present invention manages the power boosting zone. Therefore, an exemplary embodiment of the present invention transmits the important data and the data with high loss probability over the power boosting zone, thereby enabling data transmission without a waste of resources.

Figure 3A:
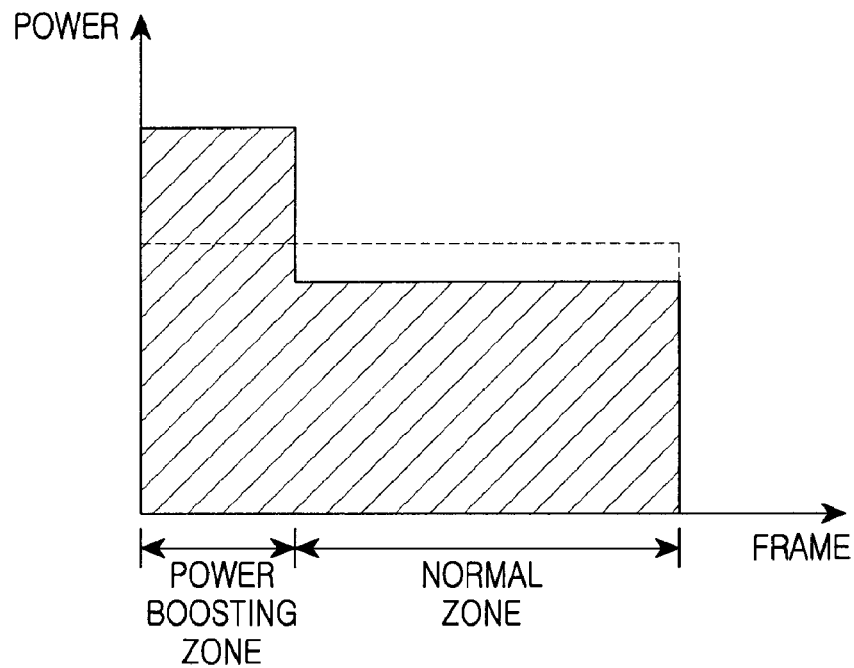
FIGS. 3A and 3B are schematic diagrams illustrating power allocated for power boosting according to an exemplary embodiment of the present invention.
Figure 3B:
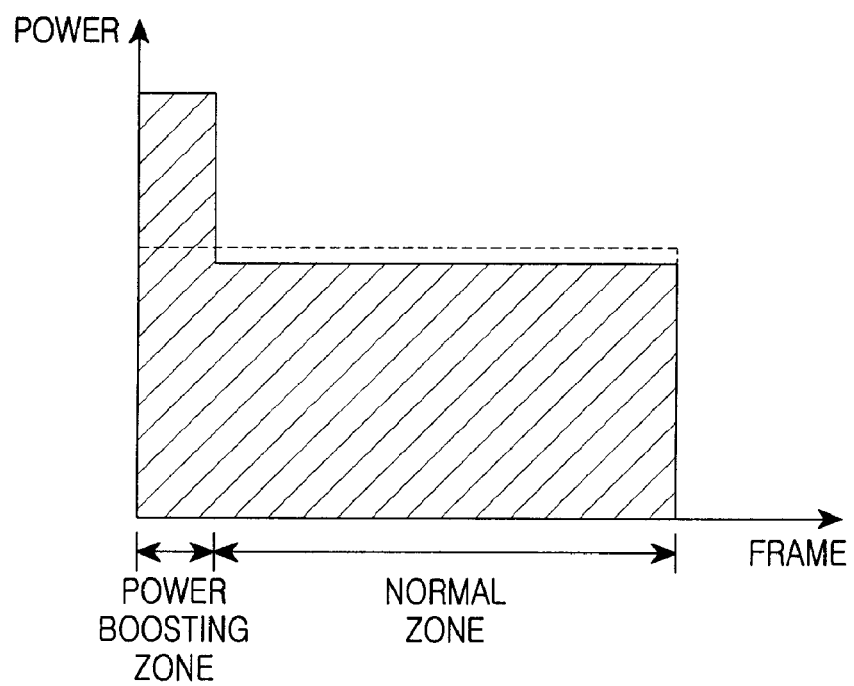

With reference to FIGS. 3A and 3B, a description will now be made of power allocated for power boosting according to an exemplary embodiment of the present invention.

FIGS. 3A and 3B are schematic diagrams illustrating power allocated for power boosting according to an exemplary embodiment of the present invention.

Referring to FIG. 3A, the horizontal axis indicates a frame, and the vertical axis indicates power allocated to the frame. The dotted line indicates power allocated to the frame in the existing communication system. As shown in FIG. 3A, the power boosting zone is higher than the normal zone in terms of the power allocated thereto. The normal zone is lower than the power boosting zone in terms of the power allocated thereto.

Referring to FIG. 3B, similarly, the horizontal axis indicates a frame, and the vertical axis indicates power allocated to the frame. In an exemplary embodiment of the present invention, because the power boosting zone is generated on a frame-by-frame basis, it can have a variable value in each frame. Therefore, the power boosting zone shown in FIG. 3B is smaller in size than the power boosting zone shown in FIG. 3A. In this case also, the power boosting zone is higher that the normal zone in terms of the power allocated thereto.

Although the difference between FIG. 3A and FIG. 3B in terms of the power levels and the sizes of the power boosting zone and the normal zone is shown herein as an example, it is not intended to limit the scope of the present invention thereto.

Figure 4:
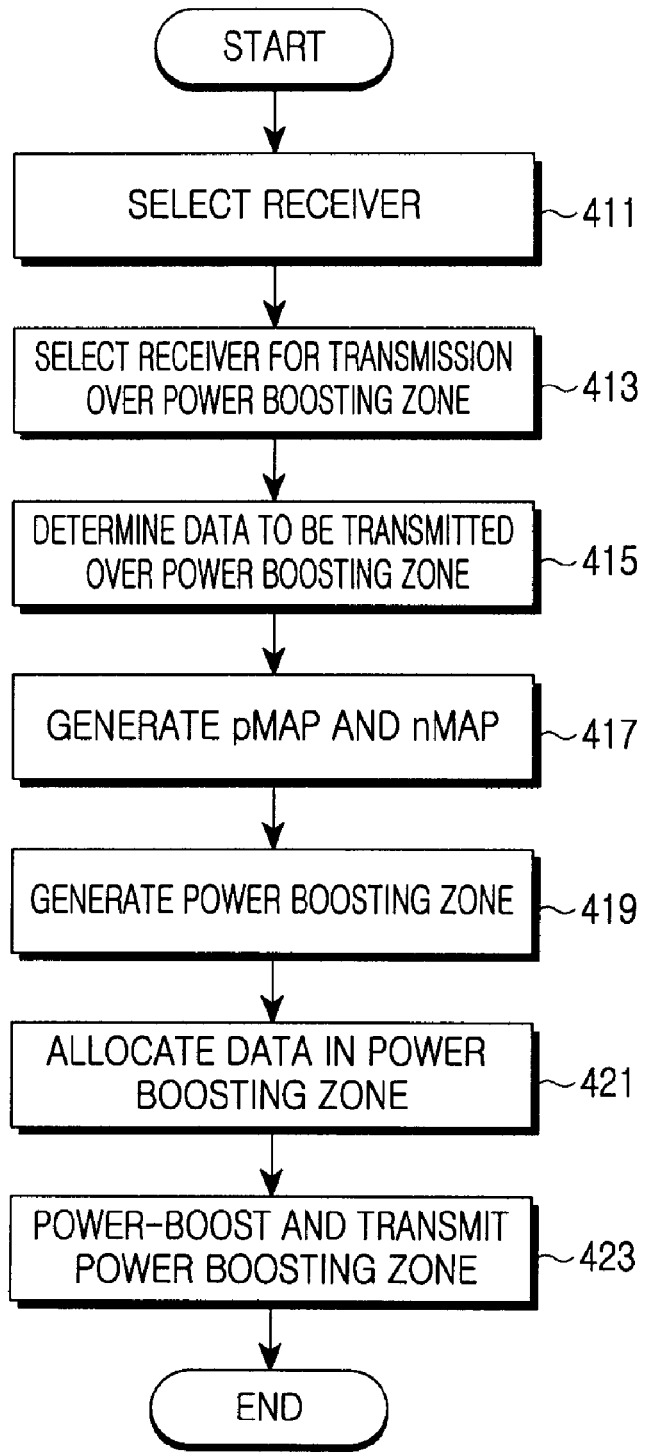
FIG. 4 is a flowchart schematically illustrating a transmission operation of a transmitter for transmitting data through power control according to an exemplary embodiment of the present invention.

With reference to FIG. 4, a description will now be made of a method for transmitting data over a power boosting zone according to an exemplary embodiment of the present invention.

FIG. 4 is a flowchart schematically illustrating a transmission operation of a transmitter for transmitting data through power control according to an exemplary embodiment of the present invention.

Referring to FIG. 4, in step 411, the transmitter selects receivers, or mobile stations, corresponding to the data to be transmitted at the current frame. The transmitter selects the receivers taking into account an amount of required service, channel status and priority of the receivers.

In step 413, the transmitter selects receivers corresponding to the data to be transmitted over the power boosting zone where power boosting is performed, from among the receivers selected in step 411. The transmitter herein selects the receivers taking into account at least one of amount of required service, channel status, and priority of the receivers. For example, the transmitter can transmit data to the receivers having a poor channel status over the power boosting zone, thereby improving the data transmission efficiency.

In step 415, the transmitter determines the data of the selected receivers as the data to be transmitted over the power boosting zone.

In step 417, the transmitter generates a pMAP and an nMAP using the information on allocated data bursts. The 'information on allocated data bursts' herein means information on data bursts to be allocated to the power boosting zone and the normal zone. Here, the transmitter generates the MAPs using allocation information of the data bursts of the receivers and channel information of the receivers receiving the data bursts.

In step 419, the transmitter generates a power boosting zone where it will perform power boosting. The power boosting zone is generated according to the data allocated to the power boosting zone. The power boosting zone is generated on a frame-by-frame basis, and the power boosting zone can have a fixed size for every frame according to system setting, or can have a variable size according to data bursts to be transmitted in each frame.

In step 421, the transmitter allocates the data to the power boosting zone. The transmitter allocates, to the power boosting zone, data, for example, at least one of frame header, pMAP and data bursts, all of which are to be power-boosted. The transmitter can also allocate the nMAP to the power boosting zone. The transmitter can herein determine whether it will allocate the nMAP to the power boosting zone or the normal zone, taking the channel status into account.

In step 423, the transmitter power-boosts and transmits the power boosting zone. The power boosting zone is higher than the normal zone in terms of the power used for transmission by the transmitter.

As is apparent from the foregoing description, according to an exemplary embodiment of the present invention, the transmitter in the communication system manages the power boosting zone, and transmits data, for example, a frame header, a MAP and data bursts over the power boosting zone. The use of the power boosting zone prevents a waste of resources and also prevents a data loss during data transmission. In addition, the use of the power boosting zone enables data transmission without a reduction in the system performance.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data by a transmitter in a communication system, the method comprising:
   selecting a receiver to which first data is to be transmitted over a power boosting zone;
   determining second data transmitted to the selected receiver as the first data to be transmitted over the power boosting zone;
   generating the power boosting zone on a frame-by-frame basis for power-boosting and transmitting the second data;
   allocating the second data to the generated power boosting zone; and
   power-boosting and transmitting the second data,
   wherein the second data comprises at least one of a frame header, a MAP and a data burst transmitted to the selected receiver, and
   wherein the frame header includes information on the power boosting zone.

2. The method of claim 1, wherein the selecting of the receiver comprises:
   selecting a receiver using at least one of amount of required service, a priority, and a channel status of the receiver.

3. The method of claim 1, wherein the frame header is included in the power boosting zone.

4. The method of claim 3, further comprising allocating, to the power boosting zone, a MAP for restoration of a data burst allocated to the power boosting zone.

5. The method of claim 4, wherein the MAP is generated using at least one of allocation information of data bursts and channel status of receivers that will receive the data bursts.

6. The method of claim 1, further comprising allocating, to the power boosting zone, a MAP for restoration of data bursts not allocated to the power boosting zone.

7. An apparatus for transmitting data in a communication system, the apparatus comprising:
   a scheduler for scheduling to select a receiver to which first data is to be transmitted over a power boosting zone, for determining second data transmitted to the selected receiver as the first data to be transmitted over the power boosting zone, for generating the power boosting zone on a frame-by-frame basis for power-boosting, for transmitting the second data, for allocating the second data to the generated power boosting zone, and for generating scheduling information according to the scheduling; and a power controller for performing power control to power-boost and transmit the second data according to the scheduling information received from the scheduler, wherein the second data comprises at least one of a frame header, a MAP and a data burst transmitted to the selected receiver, and wherein the scheduler performs scheduling to include information on the power boosting zone in the frame header.

8. The apparatus of claim 7, wherein the scheduler selects the receiver using at least one of an amount of required service, a priority and a channel status of the receiver.

9. The apparatus of claim 7, wherein the scheduler performs scheduling to include the frame header in the power boosting zone.

10. The apparatus of claim 9, wherein the scheduler performs scheduling to allocate, to the power boosting zone, a MAP for restoration of a data burst allocated to the power boosting zone.

11. The apparatus of claim 10, wherein the scheduler performs scheduling to generate the MAP using at least one of allocation information of data bursts and channel status of receivers that will receive the data bursts.

12. The apparatus of claim 7, wherein the scheduler performs scheduling to allocate, to the power boosting zone, a MAP for restoration of data bursts not allocated to the power boosting zone.

13. The apparatus of 7, wherein the power controller comprises:

a power adjustment module for controlling transmission power using the scheduling information from the scheduler; and a mixer for mixing power with transmission data to power-boost the power boosting zone through the transmission power control of the power adjustment module.

* * * * *